United States Patent [19]

Katoh et al.

[11] Patent Number: 5,080,854
[45] Date of Patent: Jan. 14, 1992

[54] METHOD OF DIE FORMING USING ELASTICALLY DEFORMABLE DIE

[75] Inventors: Masahito Katoh; Kenichi Hibino, both of Tsukuba, Japan

[73] Assignee: Agency of Industrial Science & Technology, Ministry of International Trade & Industry, Tokyo, Japan

[21] Appl. No.: 611,045

[22] Filed: Nov. 9, 1990

[30] Foreign Application Priority Data

Nov. 16, 1989 [JP] Japan .................................. 1-297993

[51] Int. Cl.$^5$ .............................................. B28B 1/00
[52] U.S. Cl. .................................... 264/313; 100/35;
100/211; 249/82; 264/316; 264/319; 264/320;
264/325; 264/2.5; 425/412; 425/DIG. 44;
425/DIG. 124

[58] Field of Search ............... 264/313, 316, 319, 320, 264/325, 2.5; 425/44, 124, 412; 249/82; 100/35, 211

[56] References Cited

U.S. PATENT DOCUMENTS 2,169,280  8/1939  Pfanstiehl ............................ 254/313
3,520,961  7/1970  Suda et al. ............................ 264/313

Primary Examiner—David A. Simmons
Assistant Examiner—Merrick Dixon
Attorney, Agent, or Firm—Oblon, Spivak, McClelland, Maier & Neustadt

[57] ABSTRACT

A method of die forming using an elastically deformable die is characterized by using a die provided in advance with a prescribed pattern of thickness variation, allowing the die to be elastically deformed by the pressure it receives from the material being formed during the forming operation, and forming the material to the configuration resulting from the deformation.

5 Claims, 4 Drawing Sheets

METHOD OF DIE FORMING USING ELASTICALLY DEFORMABLE DIE

BACKGROUND OF THE INVENTION

1. Field of the Invention

This invention relates to method of die forming by forming a material in a die, and more specifically to a method of die forming in which the material is formed to the desired shape by elastically deforming the die at the time of the forming operation (hereinafter referred to as "elastically deformable die forming").

2. Prior Art Statement

In the field of die forming it is nowadays frequently necessary to subject a material to a minute amount of forming. This is true, for example, in the production of optical products, which often have to be imparted with minute changes in shape with high precision and good reproducibility.

In carrying out such forming by conventional die forming, the die is constituted so as to resist elastic deformation and the forming operation is conducted on the premise that it will not deform. In producing a flat surface having minute irregularities (hills and valleys), therefore, it has been necessary to form the surface of the die to have a shape corresponding to the minute irregularities to be formed. With such a method, fabrication of the mold becomes increasingly difficult as the size the irregularities becomes smaller.

An example of imparting a smooth surface with minute irregularities for producing a special effect when light is reflected from the surface can be found in traditional Japanese magic mirror making. A magic mirror is made of metal having on its rear surface a pattern formed by irregularities measuring on the order of several mm. To the observer, this pattern appears to float within the normally reflected image from the front surface of the mirror.

In making such a mirror, the front surface of a cast metal plate having irregularities on the order of several mm on its rear surface is polished under strong pressure. The pressure of the polishing causes small irregularities to form on the front surface at positions corresponding to the large irregularities on the rear surface. What characterizes this technique is that the formation on the rear surface of irregularities on the order of several mm, much larger than the desired minute irregularities, makes it possible by a simple operation to form at desired locations on the front surface of the mirror the desired minute irregularities on the order of several $\mu$m. The macroscopic pattern constituted of irregularities on the order of several mm can be imparted to the rear surface with ease.

Application of the magic mirror technique to various products would, however, lead to low productivity because it would be necessary to subject each product to the polishing under strong pressure. Another inherent disadvantage would be that the necessity for the irregularities on the rear surface to correspond to the minute irregularity pattern on the front surface would make it impossible to freely configure the rear surface.

The object of this invention is to provide a die forming method which effectively utilizes the elastic deformability of the die to enable the material being formed to be imparted with a desired pattern on the micron order, simply and without need for precision machining of the configuration of the die surface.

SUMMARY OF THE INVENTION

For achieving the aforesaid purpose, the present invention provides, in a method of forming a material using a die, a method of die forming using an elastically deformable die, comprising the steps of imparting the die with variations in thickness enabling it to assume a prescribed forming configuration under elastic deformation caused by pressure received from the material being formed during the forming operation, allowing this die (hereinafter referred to as the "deformable die") to assume the prescribed forming configuration by elastically deforming, throughout or locally, under the pressure received from the material during the forming operation, and forming the material to the prescribed configuration resulting from the elastic deformation.

In the forming operation by the die forming method according to the invention, the front surface of the deformable die elastically deforms (flexes) under the pressure received from the material being formed. As a result, the formed product is imparted with a convex configuration at portions corresponding to those where the rear surface of the die is concave and, at portions corresponding to those where the rear surface of the die is convex, is, depending on the degree of the convexity, imparted with a slightly convex configuration or a concave configuration.

Thus in accordance with the method of die forming using an elastically deformable die according to this invention it is possible to effectively utilize the elastic deformability of a die for imparting a desired configuration to a material, simply and without need for precision machining of the configuration of the front surface of the die.

The above and other features of the present invention will become apparent from the following description made with reference to the drawings.

DETAILED DESCRIPTION OF THE PREFERRED EMBODIMENT

Figure 1:
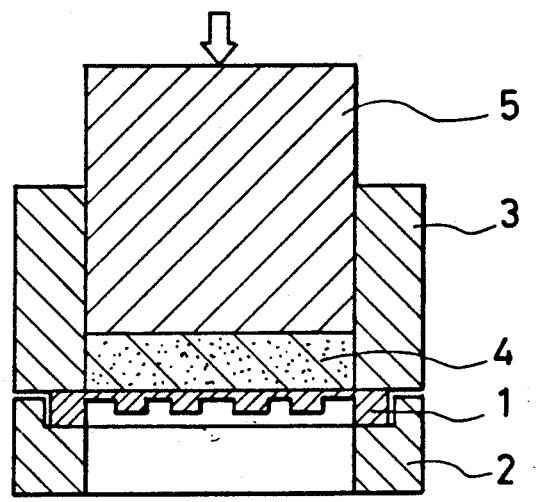
FIG. 1 is a schematic view of an embodiment of an apparatus for carrying out the die forming method according to the invention.

The inventors analyzed the deformation that occurs when a metal plate having irregularities on its rear surface is polished. As a result they learned that the polishing pressure applied to the metal plate causes it to elastically deform under the influence of the rear surface irregularities and that removal of the pressure after the front surface has been polished to a smooth finish allows the metal plate to return to its undeformed state, whereby minute irregularities appear on the polished surface. For example, where the front surface of a metal plate having irregularities on its rear surface is polished while being supported along its edges, there arises an overall concave deformation during polishing. The concave portions of the plate, i.e. the portions of small thickness, have a larger curvature than the overall curvature of the plate, while the convex portions, i.e. the portions of large thickness, have a smaller curvature. When the pressure is removed therefore, the plate surface assumes an overall convex shape, with the thick portion of the sheet either being convex to a lesser degree than the other portion or being concave. Thus when light is projected onto the polished surface, an optical pattern corresponding to the pattern on the rear surface is observed in the reflected image.

This is substantially the principle behind the magic mirror. That is to say, the magic mirror technique is essentially one of using small amounts of elastic deformation caused by differences in sheet thickness for imparting minute irregularities to a smooth surface.

On the other hand, in die forming techniques such as forging, casting, extrusion and the like, the die invariably receives pressure from the material being formed, although the degree of this pressure may differ between the different techniques. It is thus probable that the die will elastically deform, causing dimensional inaccuracies in the product. Since conventional thinking has been that die deformation has to be avoided, various efforts have been made to support the die so as to prevent it from deforming. In actual practice, however, there are cases in which deformation of the die cannot be avoided. This problem has been coped with by analyzing the deformation of the die (during forging, for example), and then modifying the die surface configuration based on the results of the analysis so as to improve the dimensional accuracy of the product.

In contrast, the approach of the present inventors was to accept die deformation as an intrinsic factor which can better be taken positive advantage of than be prevented or be compensated for by modifying the die surface shape according to the predicted deformation and, based on this logic, they accomplished the present invention.

Specifically, the present invention is characterized by using a die provided in advance with a prescribed pattern of thickness variation, allowing the die to be elastically deformed by the pressure it receives from the material being formed during the forming operation, and forming the material to the configuration resulting from the deformation.

In providing the variations in die thickness for controlling the elastic deformation of the die used for the forming operation, the rear surface of the die is provided with irregularities (hills and valleys). At portions where the formed product is required to have large convex curvature greater than that of its overall curvature, the die thickness is thinned by provision of concavities on its rear surface, and at portions where it is required to have small convex curvature or to be concave, the die thickness is thickened by the provision of convexities on its rear surface. The front surface of the die is formed with concavities, convexities and flat surfaces in accordance with the overall configuration that the formed product is required to have. The size of the irregularities on the front and rear surfaces of the die and the die thickness are determined on the basis of the desired shape of the formed material, the physical properties of the material and the amount of pressure that the die receives from the material. The position at which the die is supported is not limited to its periphery and the configuration of the formed product varies depending on the support position.

Moreover, the deformable die according to this invention may be either one that is deformable throughout or one that is generally thick and rigid and thus undeformable as a whole but is made thin at one or more specific portions so as to enable local deformation.

The actual forming of the material is conducted in the ordinary manner by a die forming method such as forging, casting or injection molding. As a result, the front surface of the deformable die is elastically deformed. If, for example, the deformable die is supported only at its periphery, the tendency of the die toward overall concavity increases. The thin portions of the die assume a larger concave curvature than the die as a whole tends to do, while the thick portions assume a surface having either a small concave curvature or a convex curvature. As a result, the configuration of the formed product is convex at the portions where the rear surface of the die is concave. On the other hand, it is either slightly convex or concave at the portions where the rear surface of the die is convex, which depending on the size of the rear surface convexities. In this way, therefore, it becomes possible to impart the formed product with micron-order variations in configuration.

The method of die forming using an elastically deformable die according to this invention can be applied to any die forming method in which a die is used for forming a material, including forging, casting and extrusion, and is capable of providing the formed product with minute configuration features.

The method of die forming using an elastically deformable die according to this invention will now be explained with reference to a working example in which it is applied to closed forging of thermoplastic resin.

Referring to FIG. 1, which shows the structure of the essential part of an apparatus for carrying out the die forming method according to this invention, a deformable die 1 is fixedly mounted at its periphery by a die clamp 2. A container 3 having a cylindrical inner surface is mounted on the deformable die 1 and a material 4 to be formed is charged into the container 3, whereafter a cylindrical ram 5 is inserted into the container 3 so as to press-form the material 4.

Figure 2A:
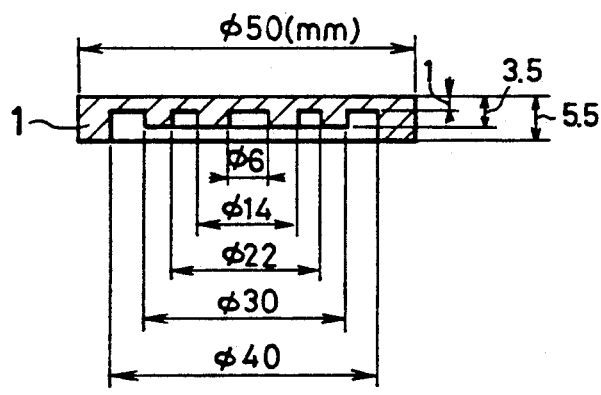
FIG. 2(a) is a sectional view showing one example of the configuration of the deformable die used in the die forming method according to the invention.
Figure 2B:
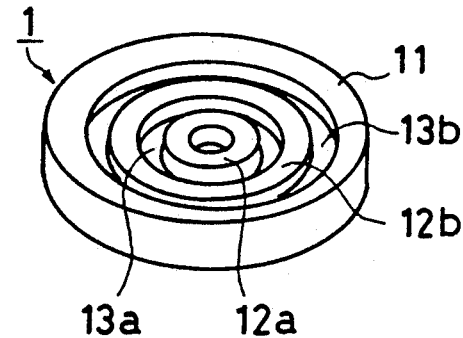
FIG. 2(b) is a perspective view of the deformable die of FIG. 2(a)

FIGS. 2(a) and 2(b) show the shape of the deformable die 1 used in this working example. The deformable die 1 has a 50 mm peripheral frame 11 within which are concentrically disposed two thick annular 12a, 12b each having a width of 4 mm and two thin portions 13a, 13b. Since the inner diameter of the container 3 is 40 mm, a corresponding center portion of the deformable die 1 measuring 40 mm in diameter is subject to loading. The annular portions 12a, 12b and the thin portions 13a, 13b respectively measure 3.5 mm and 1 mm in thickness. The die is formed of SUS 304 austenitic stainless steel.

Figure 3:
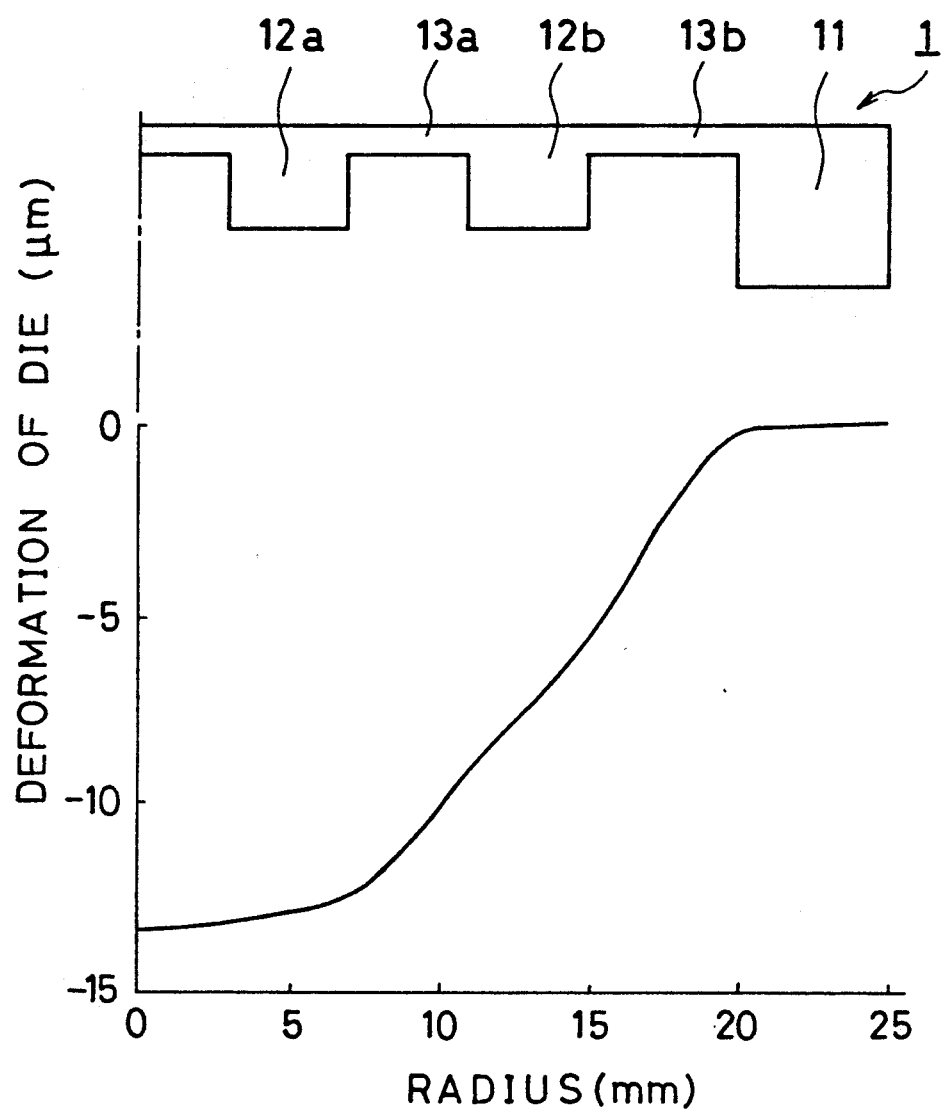
FIG. 3 is a graph showing the change in the configuration of the deformable die predicted by the finite element method.
Figure 4:
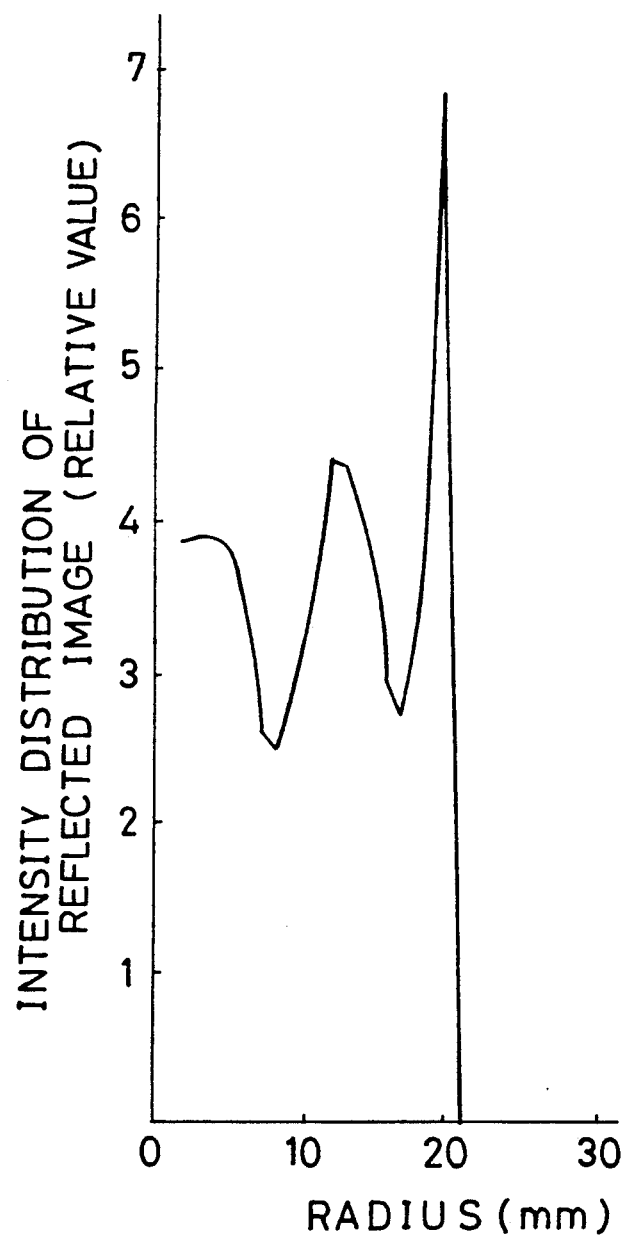
FIG. 4 is a graph showing the predicted intensity distribution of a reflected image obtained from the irregularities of a formed material.

The deformation of this die 1 was estimated by the finite element method using a triangular ring element, with the results shown in FIG. 3. The calculation was made presuming a Young's modulus of $20.0 \times 10^{10}$ Pa, a Poisson's ratio of 0.30 and a load of 80 kgf. As can be seen in FIG. 3, the difference in thickness between the thick portions 12a, 12b and the thin portions 13a, 13b can be expected to cause irregularities on the order of several microns to be formed in the surface of the formed product. Moreover, if the surface of the formed material to which this pattern has been transferred should be irradiated with parallel rays, it would be expected to produce the light intensity distribution shown in FIG. 4 at a distance of 1 meter therefrom. Specifically, there could be expected to be obtained a total of 3 concentric bright regions corresponding to the two thick portions 12a, 12b and the peripheral portion (the peripheral frame 11). Further, the central dark region would be expected to be unclear.

The results obtained when the apparatus of FIG. 1 was used to form a thermoplastic resin will now be explained.

As the material 4 there was used an ordinary transparent acrylic resin disk measuring 4 mm in thickness and about 40 mm in diameter. The material 4 was placed on the deformable die 1 within the apparatus and the whole unit was placed in a convection type constant temperature chamber where it was heated to 150° C. The unit was then allowed to cool under a compressive load of 80 kgf applied by a servopulser (product of Shimadzu Seisakusho, Japan).

Figure 5:
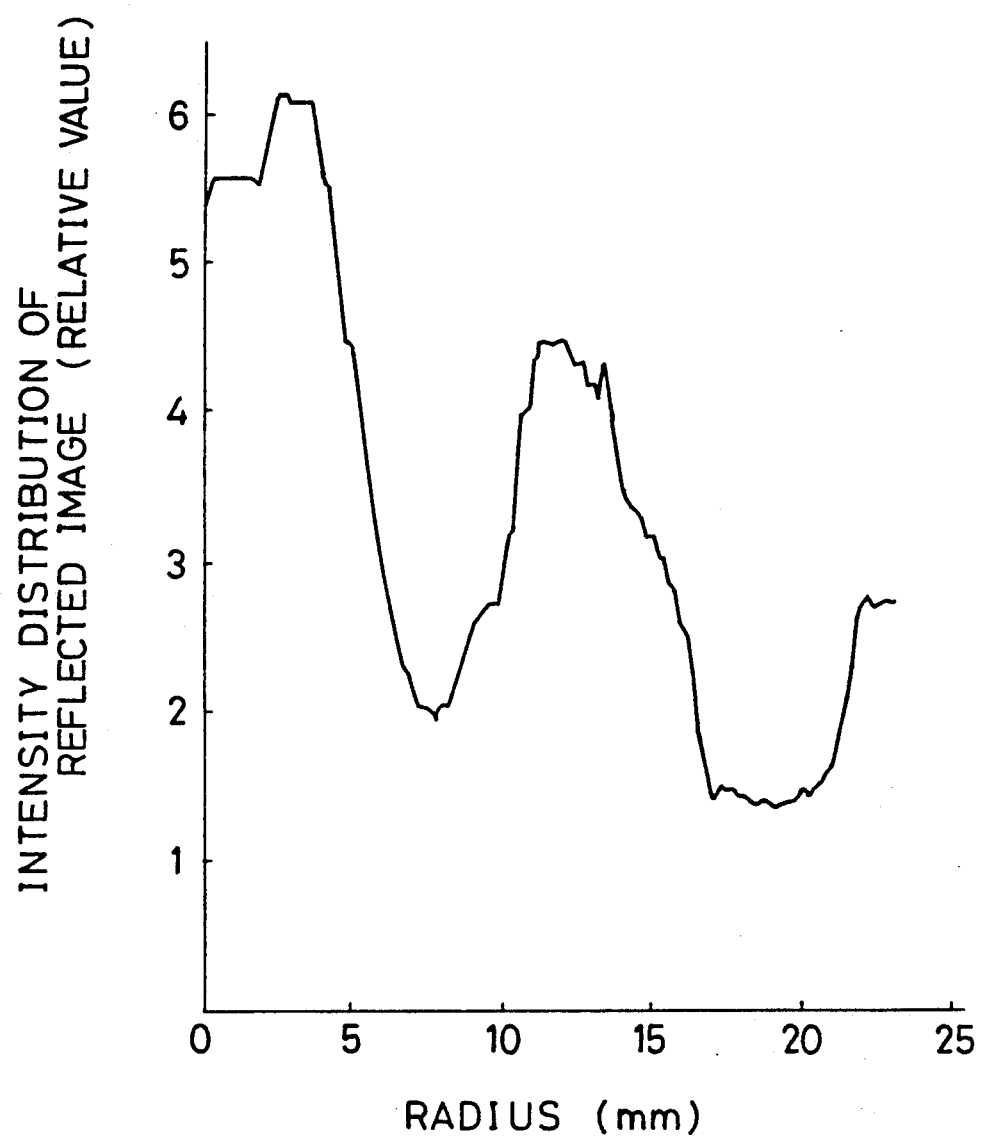
FIG. 5 is a graph showing the intensity distribution of a reflected image from a formed material.

The so-obtained formed product was irradiated with parallel rays and the intensity distribution of the reflected light was measured at 1 meter therefrom. The results obtained are shown in FIG. 5. It will be noted that bright and dark regions appeared at the predicted locations. Owing to the effect of limb darkening of the light projected onto the formed material, however, the intensity of the light fell increasingly below the calculated value with increasing distance from the center. Notwithstanding, the curve of FIG. 5 agrees well enough with the predicted curve shown in FIG. 4 to enable confirmation of the fact that the expected minute irregularities were obtained.

From the foregoing working example, it is clear that minute irregularities can be imparted using a deformable die. The invention thus provides a method for easily imparting minute variations in configuration, which has not been possible by conventional die forming methods using dies designed to resist deformation.

In the working example just described, the material was formed with the elastically deformable die disposed on the opposite side of the material from the ram. Alternately, however, it is possible to obtain the same results by carrying out the forming operation with the deformable die attached to the end of the ram in a manner that allows it to deform.

While it has been difficult, if not impossible, to impart minute irregularities to a material by conventional die forming methods using dies that resist deformation, the method according to the present invention effectively utilizes the deformability of a deformable die for enabling such minute irregularities to be imparted to the formed product with ease. Moreover, differently from the technique of magic mirror making which uses polishing for causing irregularities on the rear surface of a metal mirror to be expressed on the front surface of the mirror, the method according to this invention allows the configuration of the rear surface of the formed product to be freely selected.

While the present invention can be effectively applied in the manufacture of optical elements, ornaments that utilize light reflection and the like for imparting these articles with minute variations in configuration with high precision, it is of course not limited to these applications.

What is claimed is:

1. A die forming method comprising the steps of:
   using an elastically deformable die having a flat surface which contacts a material being formed, said die being provided with local variations in thickness so that said flat surface is formed with prescribed concavities and convexities under elastic deformation caused by pressure from the material being formed during a forming operation;
   carrying out the forming operation and thereby causing the material to contact said flat surface under a prescribed pressure; and
   allowing said prescribed concavities and convexities to be formed on the flat surface off the die under the pressure from the material, whereby the material is formed with the concavities and convexities.

2. A die forming method according to claim 1, wherein the local variations in thickness are provided by providing concavities and convexities on a surface of the die opposite to the flat surface.

3. A die forming method according to claim 1, wherein the die is supported so that it is allowed to elastically deform under the pressure received from the material being formed.

4. A die forming method according too claim 1, wherein said local variations in thickness are provided by a plurality of concentric annular rings provided on a surface of said die opposite to said flat surface.

5. A die forming method according to claim 1, wherein said material to be formed is a thermoplastic resin.

* * * * *